(12) United States Patent
Zhang

(10) Patent No.: US 8,104,157 B2
(45) Date of Patent: Jan. 31, 2012

(54) FIXING APPARATUS FOR CYLINDRICAL-SHAPED OBJECTS

(75) Inventor: Bing-Jun Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 344 days.

(21) Appl. No.: 12/608,944

(22) Filed: Oct. 29, 2009

(65) Prior Publication Data

US 2011/0005051 A1    Jan. 13, 2011

(30) Foreign Application Priority Data

Jul. 13, 2009    (CN) .......................... 2009 1 0304265

(51) Int. Cl.
*B23Q 1/25*    (2006.01)
*B23Q 3/00*    (2006.01)

(52) U.S. Cl. .......................... 29/281.1; 269/48.1; 269/55

(58) Field of Classification Search ................ 29/281.1, 29/732; 269/47, 48.1, 48.2, 48.3, 52, 55
See application file for complete search history.

(56) References Cited

U.S. PATENT DOCUMENTS

| | | | | | |
|---|---|---|---|---|---|
| 5,683,057 | A | * | 11/1997 | Gangemi | 242/573.2 |
| 5,687,962 | A | * | 11/1997 | Goodrich | 269/317 |
| 5,971,382 | A | * | 10/1999 | Scheufler, Jr. | 269/47 |
| 8,006,361 | B2 | * | 8/2011 | Hutter et al. | 29/243.518 |
| 2010/0154201 | A1 | * | 6/2010 | Pervaiz | 29/598 |

* cited by examiner

*Primary Examiner* — David B Thomas
(74) *Attorney, Agent, or Firm* — Altis Law Group, Inc.

(57) ABSTRACT

A fixing apparatus is provided to fix a cylindrical object. The fixing apparatus includes a support board, a rotating member rotatably mounted to the support board, a moving member, and a number of positioning members. The rotating member defines a receiving space, and a number of receiving slots communicating with the receiving space. The moving member includes a taper-shaped pushing portion, and the pushing portion is slidably received in the receiving space. The number of positioning members are slidably received in the corresponding receiving slots. Each positioning member includes a slanting surface resisting against a circumference of the pushing portion, and a sliding surface to resist against an intrados of the cylindrical object.

14 Claims, 5 Drawing Sheets

FIXING APPARATUS FOR CYLINDRICAL-SHAPED OBJECTS

BACKGROUND

1. Technical Field

The disclosure relates to a fixing apparatus for cylindrical objects.

2. Description of Related Art

To assure quality of articles, quality control is needed, and imperfect articles can be rejected by quality control. Sometimes, before an article is detected, a fixing apparatus is needed to fix the article, which is convenient for detecting, and can increase productivity and efficiency. However, some cylindrical articles, such as motor cases, are generally difficult to fix.

DETAILED DESCRIPTION

Figure 1:
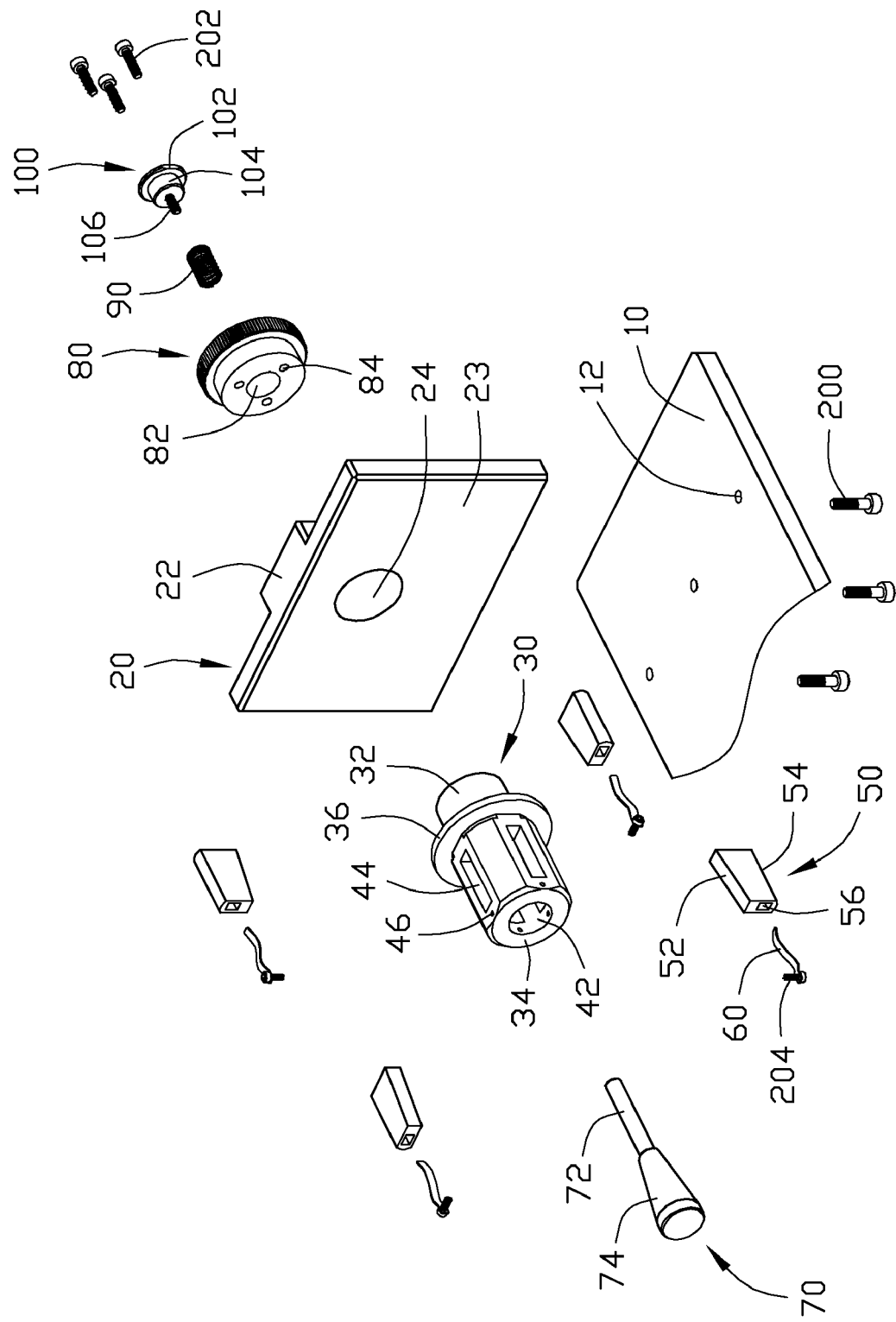
FIG. 1 is an exploded, isometric view of an exemplary embodiment of a fixing apparatus for cylindrical objects.
Figure 2:
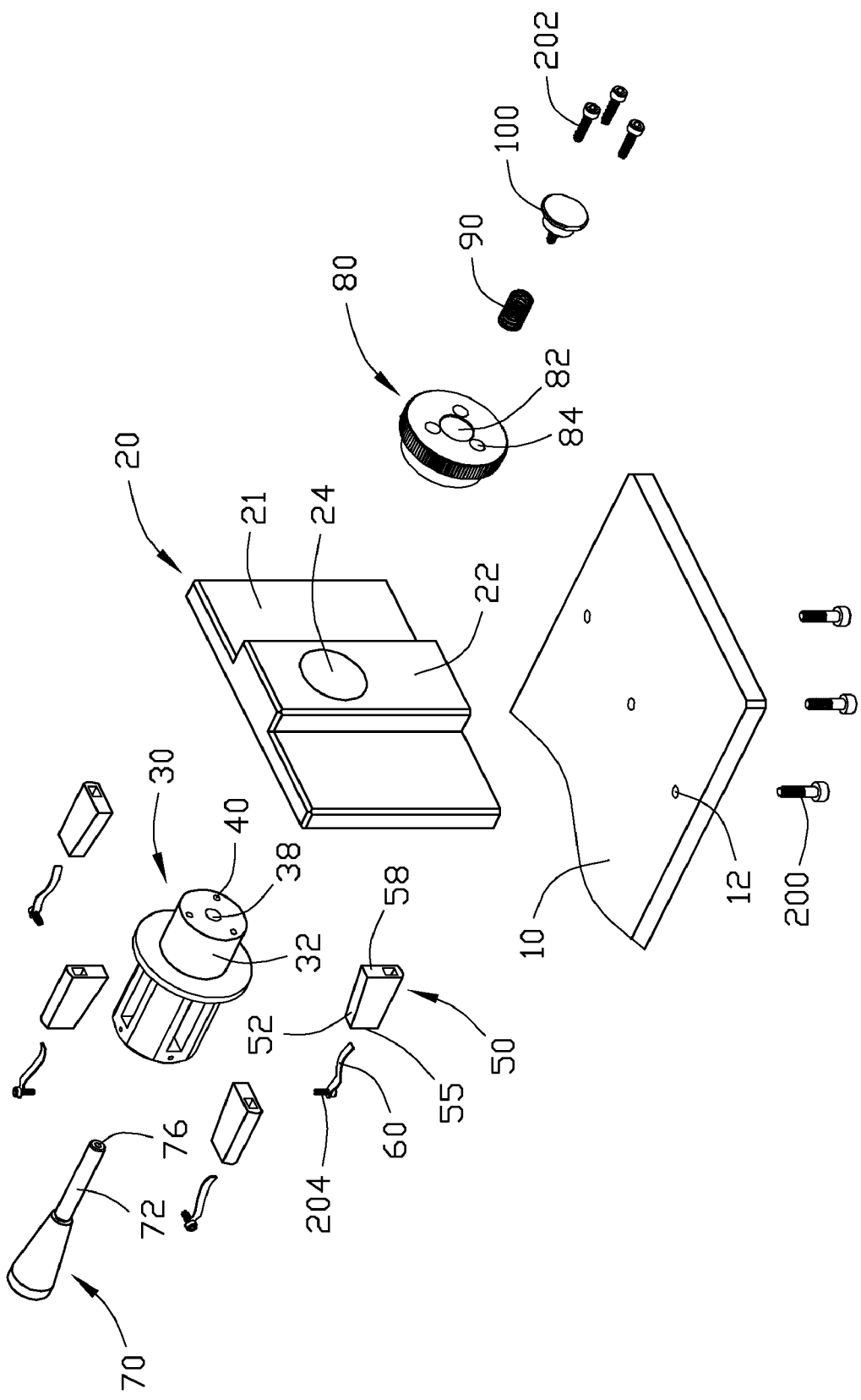
FIG. 2 is similar to FIG. 1, but viewed from another perspective.

Referring to FIGS. 1, 2, 4, and 5, an exemplary embodiment of a fixing apparatus is provided to fix a cylindrical object 300, such as a motor case. The cylindrical object 300 includes a sleeve 302 mounted to one end of the cylindrical object 300.

The fixing apparatus includes a fixing board 10, a support board 20 perpendicularly fixed to the fixing board 10, a rotating member 30, a plurality of positioning members 50, a plurality of resilient tabs 60, a moving member 70 movably mounted to the rotating member 30, an operating member 80, a resilient member 90, and a pressing member 100. In this embodiment, the resilient member 90 is a coil spring.

The fixing board 10 defines a plurality of through holes 12.

The support board 20 includes a first side 23, and a second side 21 opposite to the first side 23. A protrusion 22 protrudes from the second side 21, and extending through top and bottom surfaces of the support board 20. The protrusion 22 defines a matching hole 24 extending through the protrusion 22 and the first side 23 of the support board 20. A plurality of fixing holes 26 (shown in FIG. 5) are defined in the bottom surface of the support board 20, corresponding to the plurality of through holes 12 of the fixing board 10.

The rotating member 30 includes a fixing portion 32, a mounting portion 34 opposite to the fixing portion 32, and a resisting portion 36 between the fixing portion 32 and the mounting portion 34. The resisting portion 36 is generally washer shape, and has a diameter greater than diameters of the fixing portion 32 and the mounting portion 34. The mounting portion 34 axially defines a great receiving space 42. A circumference of the mounting portion 34 defines a plurality of receiving slots 44 communicating with the receiving space 42. A plurality of screw holes 46 are defined in the circumference of the mounting portion 34, and each screw hole 46 is situated adjacent to one end of the corresponding receiving slot 44, away from the resisting portion 36. The fixing portion 32 defines a small through hole 38 axially extending to communicate with the receiving space 42, thereby, a resisting surface 43 (shown in FIG. 5) is formed between the through hole 38 and the receiving space 42, and faces the receiving space 42. A plurality of fixing holes 40 are defined in the fixing portion 32, around the through hole 38.

Each positioning member 50 includes a slanting surface 52, a sliding surface 54 opposite to the slanting surface 52, and two opposite sidewalls 55 and 58 connected to corresponding ends of the slanting surface 52 and the sliding surface 54. The sliding surface 54 has an arc-shaped cross-section, corresponding to an intrados of the cylindrical object 300. A groove 56 is defined in each positioning member 50, extending through the two sidewalls 55 and 58.

The moving member 70 includes a taper-shaped pushing portion 74, and a rod portion 72 extending from a small end of the pushing portion 74. A taper of the pushing portion 74 is substantially equal to an angle of inclination of the slanting surface 52 of each of the plurality of positioning members 50, therefore, a circumference of the pushing portion 74 can resist against the slanting surfaces 52 of the plurality of positioning members 50. A diameter of the pushing portion 74 gradually reduces towards the rod portion 72, and a smallest diameter of the pushing portion 74 is greater than a diameter of the through hole 38 of the rotating member 30. A distal end of the rod portion 72 defines a fastening hole 76.

The operating member 80 defines a holding hole 82 in a center of the operating member 80, and a plurality of fixing holes 84 around the holding hole 82.

The pressing member 100 includes a great head portion 102, a small slide portion 104 extending from the head portion 102, and a fixing shaft 106 extending from a distal end of the slide portion 104.

Figure 3:
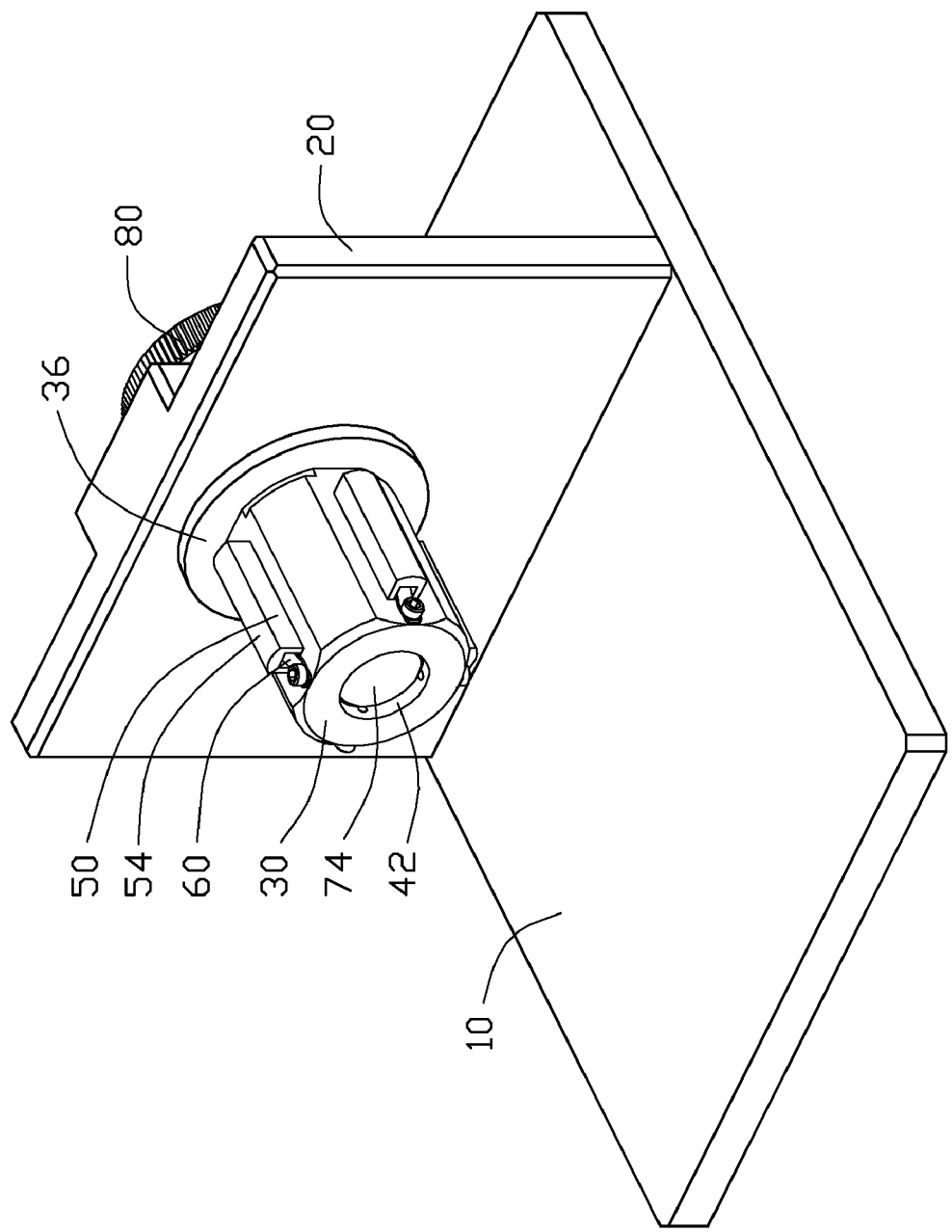
FIG. 3 is an assembled, isometric view of the fixing apparatus of FIG. 1.

Referring to FIG. 3, in assembly, a plurality of bolts 200 are passed through the plurality of through holes 12 of the fixing board 10, and then screwed into the plurality of fixing holes 26 of the support board 20. Therefore, the support board 20 is perpendicularly fixed to the fixing board 10. The fixing portion 32 of the rotating member 30 is inserted into the matching hole 24 of the support board 20, with the resisting portion 36 of the rotating member 30 abutting the first side 23 of the support board 20. A plurality of bolts 202 are passed through the plurality of fixing holes 84 of the operating member 80, and then screwed into the plurality of fixing holes 40 of the rotating member 30, thereby, the operating member 80 is fixed to the rotating member 30. The rod portion 72 of the moving member 70 is passed through the receiving space 42 and the through hole 38 of the rotating member 30, and the holding hole 82 of the operating member 80 in that order. The pushing portion 74 of the moving member 70 is slidably received in the receiving space 42, and resists against the resisting surface 43 of the rotating member 30. The resilient member 90 is received in the holding hole 82 of the operating member, and fits about the rod portion 72. The fixing shaft 106 of the pressing member 100 is fixed to the fastening hole 76 of the rod portion 72, thereby, the pressing member 100 is fixed to the moving member 70, and the slide portion 104 of the pressing member 100 is slidably received in the holding hole 82. Opposite ends of the resilient member 90 resist against the fixing portion 32 and the slide portion 104, respectively. A first end of each of the resilient tabs 60 is inserted into the groove 56 of a corresponding positioning member 50, and a second end of the resilient tab 60 is exposed out of the groove 56. The plurality of positioning members 50 are received in the plurality of receiving slots 44 of the rotating member 30, respectively, with the slanting surfaces 52 of the plurality of positioning members 50 resisting against the circumference of the pushing portion 74. The second ends of the plurality of resilient tabs 60 are fixed to the rotating member 30, via a plurality of bolts 204 passing through the plurality of resilient tabs 60 to engage in the plurality of screw holes 46, therefore, the plurality of resilient tabs 60 are deformed to resist against the corresponding positioning members 50 towards the pushing portion 74 of the moving member 70.

Figure 4:
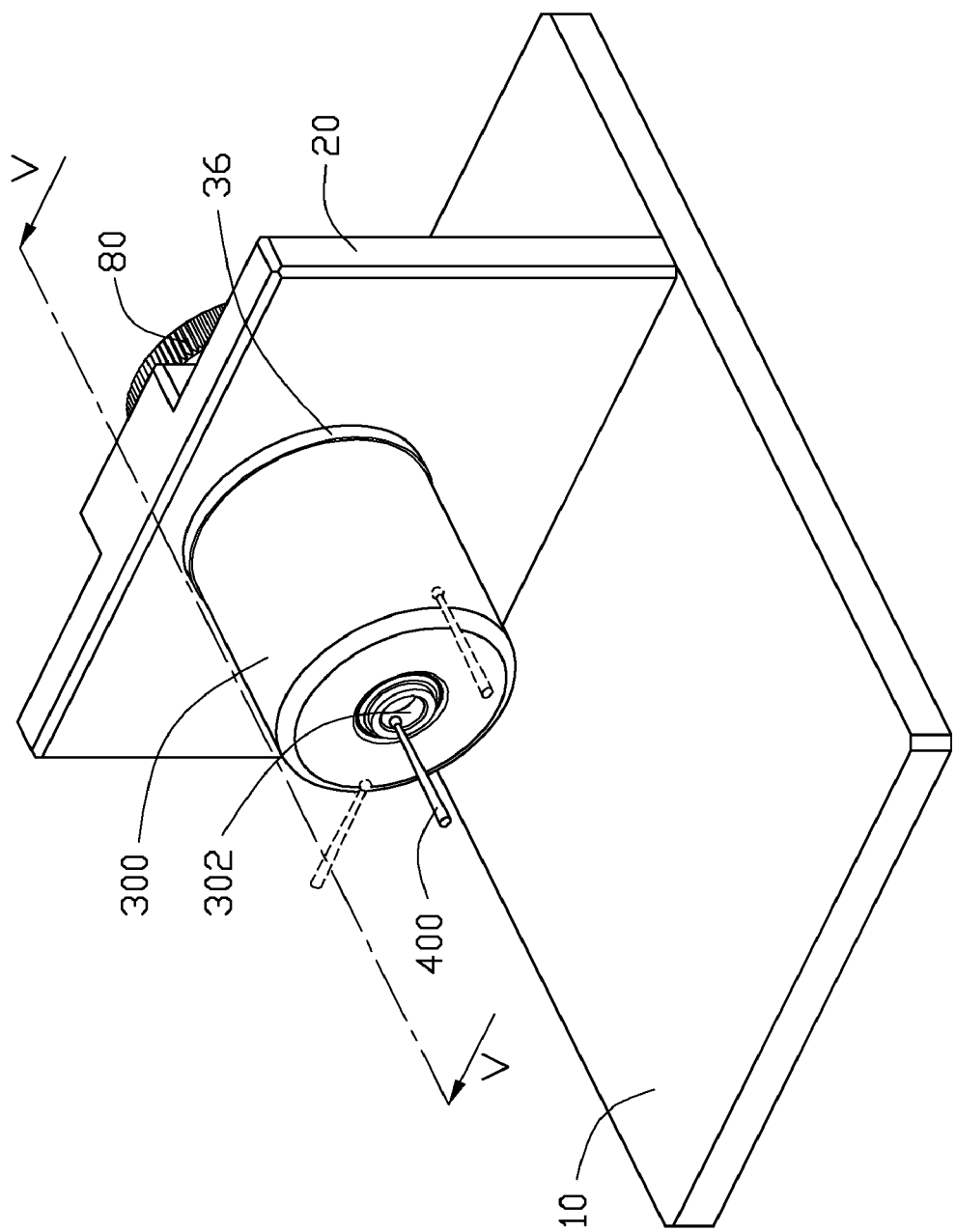
FIG. 4 is an assembled, isometric view of the fixing apparatus of FIG. 1, together with a cylindrical object fixed therupon.
Figure 5:
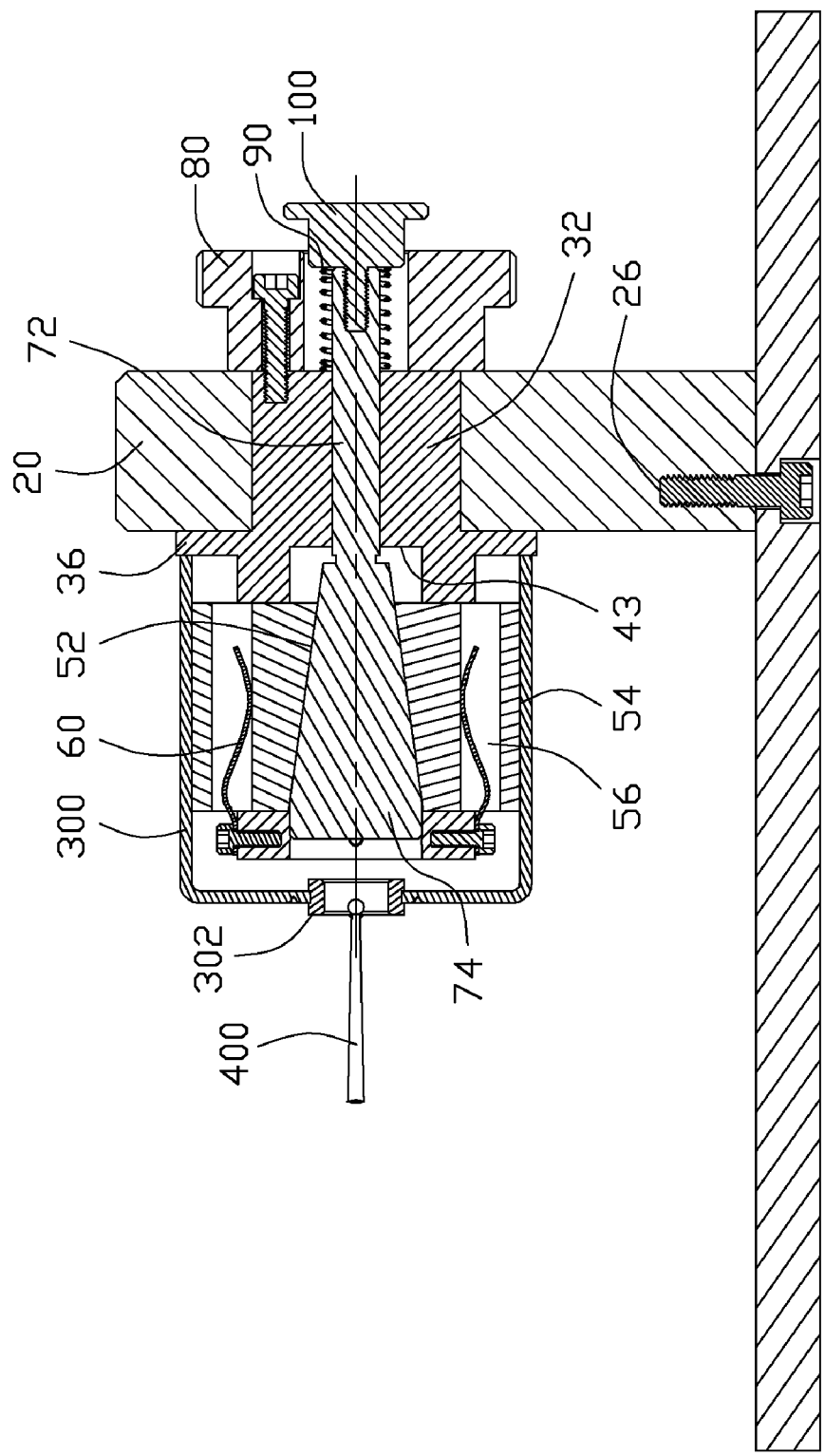
FIG. 5 is a cross-sectional view of FIG. 4, taken along the line V-V.

Referring to FIGS. 4 and 5, to mount the cylindrical object 300, the head portion 102 of the pressing member 100 is pressed towards the support board 20. As a result, the slide portion 104 of the pressing member 100 is slid in the holding hole 82 of the operating member 80, to deform the resilient member 90 and move the moving member 70. The moving member 70 is moved away from the resisting surface 43 of the rotating member 30. Therefore, the plurality of positioning members 50 move into the receiving space 42 of the rotating member 30 via the elasticity of the resilient tabs 60. The cylindrical object 300 fits about the mounting portion 34 of the rotating member 30, with the sleeve 302 of the cylindrical object 300 aligning with the receiving space 42 of the rotating member 30. The head portion 102 is released, thereby, the elasticity of the resilient member 90 moves the pressing member 100 away from the support board 20, together with the moving member 70 moving back to resist against the resisting surface 43 of the rotating member 30 with the pushing portion 74. Therefore, the circumference of the pushing portion 74 of the moving member 70 resists against the slating surfaces 52 of the plurality of positioning members 50, and pushes the positioning members 50 away from the pushing portion 74 along a radial direction of the pushing portion 74. As a result, the plurality of resilient tabs 60 are deformed, and the sliding surfaces 54 of the plurality of positioning members 50 resist against the intrados of the cylindrical object 300, for fixing the cylindrical object 300 to the moving member 70. The operating member 80 may be rotated to rotate the rotating member 30, the cylindrical object 300 is synchronously rotated together with the rotating member 30.

In use, a gauge head 400 of a tester (not shown) is contacted to difference portions of the cylindrical object 300, then geometric tolerance of the cylindrical object 300 can be measured. While the cylindrical object 300 is rotated, the gauge head 400 is contacted to an inner side of the sleeve 302 of the cylindrical object 300, concentricity of the cylindrical object 300 and the sleeve 302 can be measured. While the cylindrical object 300 is rotated, the gauge head 400 is contacted to the end of the cylindrical object 300 (shown in a first broken line in FIG. 4), end runout of the cylindrical object 300 and perpendicularity between the end and an axis of the cylindrical object 300 can be measured. While the cylindrical object 300 is rotated, the gauge head 400 is contacted to an outer circumference of the cylindrical object 300 (shown in a second broken line in FIG. 4), circularity and cylindricity of the cylindrical object 300, and concentricity between the outer circumference and the axis of the cylindrical object 300 can be measured.

To detach the cylindrical object 300 from the fixing apparatus, the head portion 102 of the pressing member 100 is pressed towards the second side 21 of the support board 20. As a result, the moving member 70 is moved away from the resisting surface 43 of the rotating member 30. Therefore, the plurality of positioning members 50 move into the receiving space 42 of the rotating member 30 via the elasticity of the plurality of resilient tabs 60. Therefore, the cylindrical object 300 can be conveniently removed from the rotating member 30.

It is believed that the present embodiment and its advantages will be understood from the foregoing description, and it will be apparent that various changes may be made thereto without departing from the spirit and scope of the description or sacrificing all of its material advantages, the example hereinbefore described merely being exemplary embodiment.

What is claimed is:

1. A fixing apparatus provided to fix a cylindrical object, the fixing apparatus comprising:
   a support board;
   a rotating member rotatably mounted to the support board, the rotating member comprising a mounting portion for the cylindrical object to fit about, the mounting portion defining a receiving space along an axis of the rotating member, and a plurality of receiving slots in a circumference of the mounting portion to communicate with the receiving space;
   a moving member movably mounted to the rotating member, the moving member comprising a taper-shaped pushing portion slidably received in the receiving space; and
   a plurality of positioning members slidably received in the corresponding receiving slots, each positioning member comprising a slanting surface resisting against a circumference of the pushing portion, and a sliding surface opposite to the slanting surface to slidably resist against an intrados of the cylindrical object.

2. The fixing apparatus of claim 1, further comprising a plurality of resilient tabs, wherein each positioning member defines a groove, a first end of each of the plurality of resilient tabs is received in the groove of a corresponding positioning member to elastically resist against a wall bounding the groove, and a second end of each of the plurality of resilient tabs is fixed to the rotating member.

3. The fixing apparatus of claim 1, wherein the rotating member further comprises a fixing portion opposite to the mounting portion, and a resisting portion between the fixing portion and the mounting portion, the support board defines a matching hole for rotatably receiving the fixing portion, the resisting portion abuts the support board.

4. The fixing apparatus of claim 3, further comprising a pressing member, and a resilient member, wherein the fixing portion defines a through hole communicating with the receiving space, the moving member further comprises a rod portion extending from the pushing portion, the rod portion is rotatably passed through the through hole of the fixing portion, the resilient member is fitted about the rod portion, and the pressing member is fixed to a distal end of the rod portion, opposite ends of the resilient member resist against the pressing member and the rotating member.

5. The fixing apparatus of claim 4, further comprising an operating member, wherein the operating member is fixed to the fixing portion of the rotating member, and abuts the support board, the operating member defines a holding hole, the resilient member is received in the holding hole.

6. The fixing apparatus of claim 4, wherein a size of the receiving space is greater than a size of the through hole of the rotating member, a resisting surface facing the receiving space is formed between the through hole and the receiving space, a small end of the pushing portion is operable to resist against the resisting surface.

7. The fixing apparatus of claim 3, further comprising a plurality of resilient tabs, wherein each positioning member defines a groove, a first end of each resilient tab is received in the groove of a corresponding positioning member to elastically resist against a wall bounding the groove, and a second end of the resilient tab is fixed to the mounting portion, away from the resisting portion of the rotating member, the elasticity of the plurality of resilient tabs drives the slanting surfaces of the plurality of positioning members to firmly resist against the circumference of the pushing portion.

8. A fixing apparatus provided to fix a cylindrical object, the fixing apparatus comprising:
   a support board;
   a rotating member comprising a mounting portion located at a first side of the support board for the cylindrical object to fit about, and a fixing portion rotatably mounted to the support board and exposed through a second side opposite to the first side of the support board, the mounting portion defining a receiving space along an axis of the mounting portion, and a plurality of receiving slots in a circumference of the mounting portion to communicate with the receiving space;
   a moving member comprising a taper-shaped pushing portion slidably received in the receiving space; and
   a plurality of positioning members slidably received in the corresponding receiving slots, each positioning member comprising a slanting surface resisting against a circumference of the pushing portion;
   wherein when the moving member is slid towards the fixing portion in the receiving space, the plurality of positioning members are moved out in the corresponding receiving slots to resist against an intrados of the cylindrical object; when the moving member is slid away from the fixing portion in the receiving space, the slanting surfaces of the plurality of positioning members are moved into the receiving space, and the plurality of positioning members move towards the receiving space to release the cylindrical object.

9. The fixing apparatus of claim 8, further comprising a plurality of resilient tabs, wherein each positioning member defines a groove, a first end of each of the resilient tabs is received in the groove of a corresponding positioning member and resists against a wall bounding the groove, and a second end of each of the resilient tabs is fixed to the rotating member.

10. The fixing apparatus of claim 8, wherein the rotating member further comprise a resisting portion between the fixing portion and the mounting portion, the support board defines a matching hole for the fixing portion rotatably passing through the support board, the resisting portion abuts the first side of the support board.

11. The fixing apparatus of claim 10, further comprising a pressing member, and a resilient member, wherein the fixing portion defines a through hole communicating with the receiving space, the moving member further comprises a rod portion extending from the pushing portion, the rod portion is rotatably passed through the through hole, the resilient member is mounted to the rod portion, and the pressing member is fixed to a distal end of the rod portion, opposite ends of the resilient member resist against the pressing member and the rotating member.

12. The fixing apparatus of claim 11, further comprising an operating member fixed to the fixing portion of the rotating member, wherein the operating member abuts the second side of the support board, the operating member defines a holding hole, the resilient member is received in the holding hole.

13. The fixing apparatus of claim 11, wherein the receiving space has a greater size than the through hole of the rotating member, a resisting surface is formed between the through hole and the receiving space, and faces the receiving space, a small end of the pushing portion is operable to resist against the resisting surface.

14. The fixing apparatus of claim 10, further comprising a plurality of resilient tabs, wherein each positioning member defines a groove, a first end of each of the plurality of resilient tabs is received in the groove and resists against a wall bounding the groove, and a second end of each of the plurality of resilient tabs is fixed to the mounting portion, the elasticity of the plurality of resilient tabs drives the slanting surfaces of the plurality of positioning members to firmly resist against the circumference of the pushing portion.

* * * * *